No. 713,154. Patented Nov. 11, 1902.
S. W. RICHARDSON.
COOKER.
(Application filed Mar. 1, 1902.)
(No Model.)
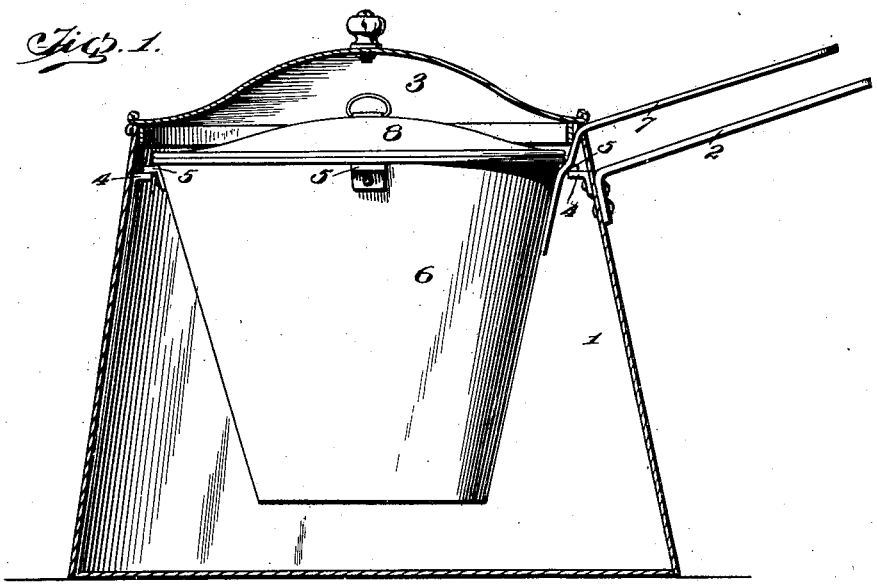
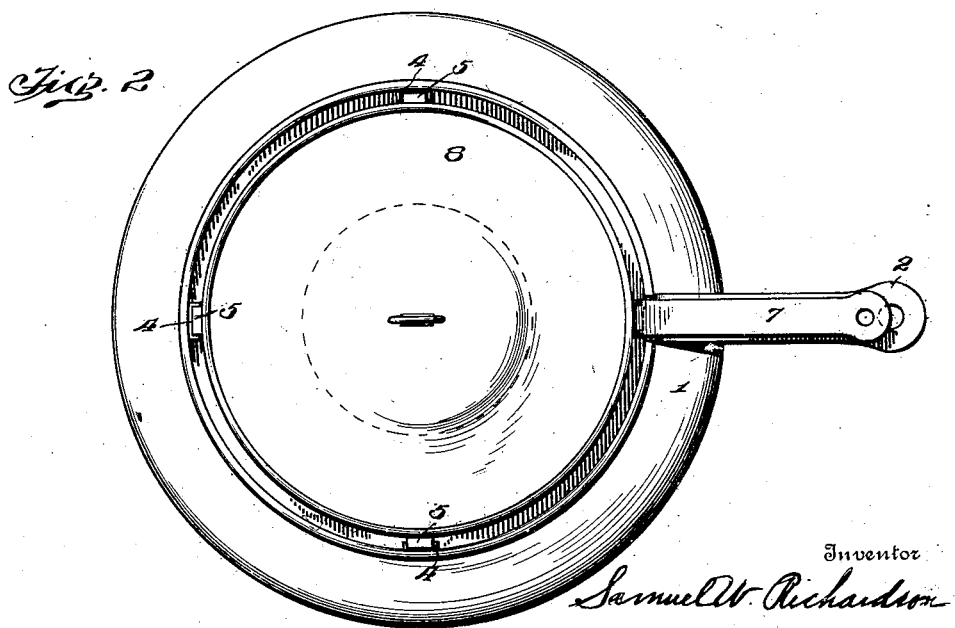
Witnesses
L. G. Handy
Edgar W. Kitchin
Inventor
Samuel W. Richardson
By
Mason Fenwick Lawrence
his Attorneys

UNITED STATES PATENT OFFICE.

SAMUEL W. RICHARDSON, OF DULUTH, MINNESOTA.

COOKER.

SPECIFICATION forming part of Letters Patent No. 713,154, dated November 11, 1902.

Application filed March 1, 1902. Serial No. 96,301. (No model.)

*To all whom it may concern:*

Be it known that I, SAMUEL W. RICHARDSON, a citizen of the United States, residing at Duluth, in the county of St. Louis and State of Minnesota, have invented certain new and useful Improvements in Cookers; and I do hereby declare the following to be a full, clear, and exact description of the invention, such as will enable others skilled in the art to which it appertains to make and use the same.

This invention relates to improvements in cooking utensils, and more particularly to nested cookers.

The object in view is the production of a cooker which shall affect the articles being cooked from all points, so that the same will be heated evenly throughout.

With this and other objects in view the invention consists in certain novel constructions, combinations, and arrangements of parts, as will be hereinafter fully described and claimed.

In the accompanying drawings, Figure 1 represents a vertical central section through a cooker embodying the features of the present invention. Fig. 2 represents a top plan view of the same with the covers removed.

In the art to which this invention relates it has been found desirable to heat the article operated upon not only from the sides and bottom, but also from the top, and in order to attain this and other valuable results I employ, as will be seen by reference to the accompanying drawings, a suitable receptacle, as 1, with a suitable handle of any preferred and well-known type, as 2. The upper end of the receptacle 1 is preferably open and is closed by any preferred form of cover or lid, as 3, engaging in any suitable manner the upper edge of the walls of the said receptacle 1. Projecting inwardly from the inner face of said walls are any desired number of lugs, as 4 4, designed to be engaged by similar lugs 5 5, projecting from the outer face of the walls of an inner receptacle, as 6, said inner receptacle being provided with a suitable handle, as 7, extending through a notch formed in the upper edge of the wall of receptacle 1, preferably at a point in the same vertical plane with handle 2. The lugs projecting from the inner receptacle are so spaced with respect to the handle of said receptacle and the lugs projecting inwardly in the outer receptacle are so arranged and spaced with respect to the notch in the edge of said receptacle that when the handle of the inner receptacle is inserted in said notch or recess the lugs of the inner receptacle will be made to register or coincide with the lugs of the outer receptacle. In this manner the inner receptacle can be quickly put into place without giving especial attention to the position of the lugs. Any preferred form of cover or cap, as 8, is provided for closing the upper open end of receptacle 6, the closure being steam and water tight.

The receptacle 1 preferably flares downwardly, while the receptacle 6 in its preferred form is made to flare upwardly, whereby the larger diameter of the receptacle 6 lies between the walls of receptacle 1, at the point of the smaller diameter thereof, while the smaller portion of receptacle 6 is held between the larger portion of the receptacle 1, whereby in operation a quantity of water may surround the lower portion of said receptacle 6 and be retained near the heating medium for the more ready generation of steam, and the reduced upper portion of receptacle 1 is designed to direct the steam thus generated about the enlarged upper end of receptacle 6 for heating the food contained in said receptacle 6 to the same degree from the top as from the sides and bottom.

The operation of the present device is readily apparent, as it is only necessary to place the articles to be cooked within the receptacle 6, close lid 8, entirely or partially fill receptacle 1 with water, and then heat the same, the action of the heat being distributed evenly about the said receptacle 6 through the relative sizes and positions of the two receptacles.

It will be noted that the particular arrangement of the handles 2 and 7 is such as to facilitate a ready handling of the entire cooker or the easy removal of the receptacle 6 whenever it is desired.

Although I have specifically set forth one particular embodiment of the device, yet it will be apparent that many slight changes may be made without deviating from the spirit and scope of the invention—as, for instance, instead of employing lugs 4 and 5 suitable flanges may be used, provided with perforations for permitting intercommunication between the top and sides of the receptacle 1, and any other slight changes may be made within the skill of a mechanic which I shall feel at liberty to employ when desired.

Having fully described my invention, what I claim as new, and desire to secure by Letters Patent of the United States, is—

1. A cooking utensil comprising an outer receptacle and an inner receptacle, a series of inwardly-projecting supporting-lugs upon the outer receptacle and a series of outwardly-projecting lugs on the inner receptacle, and means for causing the said lugs to register when the inner receptacle is placed in the outer one, a space being left around the said inner receptacle to permit of steam circulating around the top as well as the bottom and sides of the inner receptacle, substantially as described.

2. A cooking utensil comprising an outer receptacle and an inclosing receptacle, the inner receptacle being adapted to be entirely inclosed in the outer receptacle, a series of supporting-lugs on the outer receptacle and a series of correspondingly-arranged supporting-lugs on the inner receptacle, a handle on the inner receptacle, a recess formed in the edge of the outer receptacle for engaging said handle so that by placing the handle in said recess the supporting-lugs may always be caused to register, substantially as described.

3. A cooking utensil comprising an outer receptacle tapering upwardly and provided with a suitable cover, the said receptacle being formed with a notch in its edge, inwardly-projecting lugs on the inner surface of the outer receptacle arranged below the upper edge thereof, an inner receptacle tapering downwardly, and adapted to be entirely inclosed within the outer receptacle, lugs on the inner receptacle registering with the lugs on the outer receptacle for supporting said inner receptacle, and a handle on the inner receptacle engaging the notch or recess formed in the edge of the outer receptacle, the said lugs being always caused to register when the handle engages the said recess, substantially as described.

In testimony whereof I hereunto affix my signature in presence of two witnesses.

SAMUEL W. RICHARDSON.

Witnesses:
JAMES T. WATSON,
J. H. SHARP.